US008828181B2

(12) United States Patent
Burch

(10) Patent No.: US 8,828,181 B2
(45) Date of Patent: Sep. 9, 2014

(54) TEMPERATURE SWITCHABLE ADHESIVES COMPRISING A CRYSTALLIZABLE OIL

(75) Inventor: Robert Ray Burch, Exton, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1004 days.

(21) Appl. No.: 12/771,078

(22) Filed: Apr. 30, 2010

(65) Prior Publication Data

US 2011/0265949 A1    Nov. 3, 2011

(51) Int. Cl.
| | | |
|---|---|---|
| *B32B 27/00* | (2006.01) | |
| *C08K 5/00* | (2006.01) | |
| *C08J 3/22* | (2006.01) | |
| *C09J 7/02* | (2006.01) | |
| *C09J 9/00* | (2006.01) | |
| *C09J 11/06* | (2006.01) | |
| *C09J 11/00* | (2006.01) | |
| *C09J 153/02* | (2006.01) | |
| *C08K 5/01* | (2006.01) | |
| *C08K 5/09* | (2006.01) | |

(52) U.S. Cl.
CPC ............ *C09J 153/02* (2013.01); *C09J 2491/00* (2013.01); *C09J 7/0221* (2013.01); *C09J 9/00* (2013.01); *C08K 5/01* (2013.01); *C09J 2453/00* (2013.01); *C08K 5/09* (2013.01); *C09J 2201/622* (2013.01); *C09J 11/06* (2013.01); *C09J 11/00* (2013.01)
USPC ............................ 156/334; 524/285; 524/525

(58) Field of Classification Search
USPC .................................. 156/334; 524/285, 525
See application file for complete search history.

(56) References Cited

U.S. PATENT DOCUMENTS

| | | |
|---|---|---|
| 1,957,786 A | 5/1934 | Koch |
| 2,179,339 A | 11/1939 | Little |
| 3,873,643 A | 3/1975 | Wu et al. |
| 4,421,737 A | 12/1983 | Ito et al. |
| 4,584,188 A | 4/1986 | Graham |
| 4,605,596 A | 8/1986 | Fry |
| 4,605,696 A | 8/1986 | Benko et al. |
| 5,116,824 A | 5/1992 | Miyata et al. |
| 5,156,911 A | 10/1992 | Stewart |
| 5,162,430 A | 11/1992 | Rhee et al. |
| 5,292,802 A | 3/1994 | Rhee et al. |
| 5,308,889 A | 5/1994 | Rhee et al. |
| 5,324,775 A | 6/1994 | Rhee et al. |
| 5,328,995 A | 7/1994 | Schaulin et al. |
| 5,387,450 A | 2/1995 | Stewart |
| 5,391,375 A | 2/1995 | Hille et al. |
| 5,412,035 A | 5/1995 | Schmitt et al. |
| 5,505,952 A | 4/1996 | Jiang et al. |
| 5,514,379 A | 5/1996 | Weissleder et al. |
| 5,643,575 A | 7/1997 | Martinez et al. |
| 5,698,620 A | 12/1997 | Wideman et al. |
| 5,725,874 A | 3/1998 | Oda et al. |
| 5,733,563 A | 3/1998 | Fortier |
| 6,288,149 B1 | 9/2001 | Kroll |
| 7,399,800 B2 | 7/2008 | Burch |
| 7,899,800 B2 | 3/2011 | Fachan et al. |
| 2006/0235149 A1 | 10/2006 | Burch |

FOREIGN PATENT DOCUMENTS

| | | |
|---|---|---|
| JP | 1982-102932 | 6/1982 |
| JP | 1988-11167 | 1/1988 |
| WO | WO 91/15368 | 10/1991 |

*Primary Examiner* — Michael Orlando
(74) *Attorney, Agent, or Firm* — Kevin S. Dobson

(57) ABSTRACT

Temperature switchable adhesives formed by combining a pressure sensitive adhesive, which does not exhibit temperature switchable properties, with a crystallizable oil are described. These temperature switchable adhesives exhibit a sharp reduction in peel strength when the temperature is raised above the switching temperature. The adhesive properties of these adhesives may be readily tuned by adjusting the ratio of the elastomer, tackifier, and the crystallizable oil, and by choosing different crystallizable oils. The temperature switchable adhesives have use in medical, consumer, and industrial applications.

14 Claims, No Drawings

TEMPERATURE SWITCHABLE ADHESIVES COMPRISING A CRYSTALLIZABLE OIL

FIELD OF THE INVENTION

The invention relates to the field of pressure sensitive adhesives. More specifically, the invention relates to temperature switchable adhesives formed by combining a pressure sensitive adhesive, which does not exhibit temperature switchable properties, with a crystallizable oil.

BACKGROUND OF THE INVENTION

Pressure sensitive adhesives (PSA) are well known and are used in many industrial, consumer and medical applications. Pressure sensitive adhesives are formulations typically comprising an elastomeric polymer, a tackifier, and optionally an oil or other additives. These adhesives remain permanently tacky and adhere instantaneously to a wide variety of surfaces with the application of a small amount of pressure. Pressure sensitive adhesives are generally used in the form of a coating on a backing, such as in adhesive bandages, wound dressings, transdermal delivery devices, tapes, stencils, wall paper, envelopes, stamps, and floor tiles.

For many applications, it is desirable to be able to remove the adhesive from the surface without significant force, so that the surface, for example, newly healed skin, is not damaged. For this reason, switchable adhesives, which undergo a reduction in peel strength with a change in conditions, have been developed. Switchable adhesives that exhibit a reduction in peel strength upon contact with water or exposure to UV radiation are known. Particularly useful for some adhesive applications are temperature switchable adhesives, which undergo a reduction in peel strength with a temperature change. For example, Stewart (U.S. Pat. Nos. 5,156,911 and 5,387,450) describes a temperature switchable adhesive composition comprising a side chain crystallizable polymer. Additionally, Schmitt et al. (U.S. Pat. No. 5,412,035) describes pressure sensitive adhesive compositions containing a crystalline polymeric additive that lose adhesive strength upon heating. The crystalline polymeric additive is preferably a side chain crystallizable polymer having a weight average molecular weight of less than 25,000. However, new approaches to preparing temperature switchable adhesives are needed to meet the requirements for many different applications.

Therefore, the need exists for new temperature switchable adhesives for which the temperature switching properties may be readily adjusted to meet the requirements for many different applications by readily changing the tackifier, elastomer, and oil used in the formulation, according to standard principles of adhesive formulation.

SUMMARY OF THE INVENTION

The stated need is addressed herein by the discovery that crystallizable oils may be used to provide new temperature switchable adhesive compositions. The adhesive properties of these adhesives may be readily tuned to meet the requirements of various applications.

Accordingly, in one embodiment the invention provides a temperature switchable adhesive composition comprising:
a) at least one pressure sensitive adhesive, which does not exhibit temperature switchable properties, having a rubbery plateau between a first temperature T1 and a second temperature T2; and
b) at least one oil having a crystalline melting point between T1 and T2 in an amount of at least about 20% by weight of the composition.

In another embodiment, the invention provides a temperature switchable adhesive assembly comprising: a backing and a coating comprising the temperature switchable adhesive composition disclosed herein.

In another embodiment, the invention provides a method for imparting temperature switchable properties to a pressure sensitive adhesive, the method comprising the steps of:
a) providing at least one pressure sensitive adhesive, which does not exhibit temperature switchable properties, having a rubbery plateau between a first temperature T1 and a second temperature T2; and
b) mixing the at least one pressure sensitive adhesive with at least one oil having a crystalline melting point between T1 and T2, wherein the oil is in an amount of at least about 20% by weight.

In another embodiment, the invention provides a method of attaching a temperature switchable adhesive assembly to a substrate comprising the steps of:
a) providing a temperature switchable adhesive assembly comprising a backing and a coating comprising a temperature switchable adhesive composition, the temperature switchable adhesive composition comprising:
   i) at least one pressure sensitive adhesive, which does not exhibit temperature switchable properties, having a rubbery plateau between a first temperature T1 and a second temperature T2; and
   ii) at least one oil having a crystalline melting point between T1 and T2 in an amount of at least about 20% by weight of the composition;
b) applying the temperature switchable adhesive assembly to a substrate at a temperature above the switching temperature of the temperature switchable adhesive composition; and
c) cooling the temperature switchable adhesive assembly to a temperature below the switching temperature of the temperature switchable adhesive composition.

In another embodiment, the invention provides a method of removing a temperature switchable adhesive assembly from a substrate comprising the steps of:
a) providing a temperature switchable adhesive assembly attached to a substrate, said temperature switchable adhesive assembly comprising a backing and a coating comprising a temperature switchable adhesive composition, said temperature switchable adhesive composition comprising:
   i) at least one pressure sensitive adhesive, which does not exhibit temperature switchable properties, having a rubbery plateau between a first temperature T1 and a second temperature T2; and
   ii) at least one oil having a crystalline melting point between T1 and T2 in an amount of at least about 20% by weight of the composition;
b) heating the temperature switchable adhesive assembly to a temperature above the switching temperature of the temperature switchable adhesive composition; and
c) removing the temperature switchable adhesive assembly from the substrate.

DETAILED DESCRIPTION OF THE INVENTION

Disclosed herein are temperature switchable adhesives comprising a pressure sensitive adhesive, which does not posses temperature switchable properties, and a crystallizable oil. The adhesive properties of these adhesives may be tuned by changing the crystallizable oil used or by adjusting the concentration of the oil. These properties include the switching temperature, the peel strength above and below the switching temperature, and the tack above and below the switching temperature.

The temperature switchable adhesives have application in industrial, consumer, and medical fields. For example, the temperature switchable adhesives may be used in medical applications to attach adhesive tape, adhesive bandages, immobilization devices, wound dressings, transdermal delivery devices, EKG electrodes, and the like to skin. These devices may be easily removed, without damage to the skin, by changing the temperature. Additionally, the adhesives may be used in industrial and consumer applications, such as masking tapes, stencils, envelopes, stamps, labels, wallpaper, and floor tiles.

DEFINITION OF TERMS

The following definitions are used herein and should be referred to for interpretation of the claims and the specification.

The phrase "temperature switchable adhesive" refers to a pressure sensitive adhesive that exhibits temperature switchable properties.

The phrase "temperature switchable properties" as used herein refers to properties exhibited by a temperature switchable adhesive whereby the peel strength of the adhesive is reduced by at least about 50%, more particularly at least about 90%, when the temperature is changed over a range of about 10° C., more particularly a range less than 5° C.

The term "switching temperature" refers to the temperature at which the temperature switchable adhesives disclosed herein undergo a sharp change in peel strength. The peel strength is high below the switching temperature and decreases sharply above the switching temperature.

The term "peel strength" refers to the strength of the adhesive bond of an adhesive, measured as the average load per unit width of bond line required to separate bonded materials. Standard laminates of the temperature switchable adhesives on backing and substrates used for measuring the peel strength are prepared according to ASTM Method D-3330. The 90° peel strength is measured according to IPC Test Method 650.

The term "elastomer" refers to a polymer that recovers completely and very quickly from great extensions, which can be up to 1000% or more. As used herein, elastomers include thermoplastic elastomers, which include uncrosslinked polyolefins that are elastomeric. Styrene-butadiene-styrene tri-block copolymers are a notable example.

The term "tackifier" refers to a substance added to resins to improve the initial and extended tack range of the adhesive.

The term "tack" refers to the ability of a material to stick to the surface on momentary contact and then to resist separation.

The term "crystallizable oil" refers to an oil that has a crystalline melting point (CMP) within the rubbery plateau of the pressure sensitive adhesive.

The term "crystalline melting point" refers to the temperature at which the crystalline or semi-crystalline phase transitions to an amorphous phase.

The term "rubbery plateau" as used herein in reference to pressure sensitive adhesives, refers to the temperature region between the glass transition temperature (T1) and the temperature at which the material flows as a low viscosity liquid (T2) wherein the stiffness of the pressure sensitive adhesive remains relatively constant. A detailed discussion of the rubbery plateau can be found in standard polymer science textbooks, such as *The Elements of Polymer Science and Engineering*, A. Rubin, Academic Press, NY, 1982, page 395.

The phrase "temperature switchable adhesive assembly" refers to a material comprising a backing coated with a temperature switchable adhesive.

The term "substrate" refers to any surface to which application of the temperature switchable adhesive assembly is desired.

Crystallizable Oils

In the temperature switchable adhesives disclosed herein, a crystallizable oil is used to impart temperature switchable properties to a pressure sensitive adhesive that does not exhibit temperature switchable properties. Suitable crystallizable oils are oils that have a crystalline melting point (CMP) within the rubbery plateau of the pressure sensitive adhesive being used, specifically between the glass transition temperature (T1) and the temperature at which the material flows as a low viscosity liquid (T2). Therefore, the choice of a suitable crystallizable oil depends on the pressure sensitive adhesive of interest. The temperature range of the rubbery plateau region of the pressure sensitive adhesive may be found in the literature or may be determined experimentally using methods known in the art (e.g., thermomechanical analysis). Then, oils that have a crystalline melting point within the rubbery plateau region of the pressure sensitive adhesive of interest may be found in the literature (e.g., *The Handbook of Chemistry and Physics*, CRC Press, Boca Raton, Fla.). The switching temperature of the adhesive may be controlled by selecting crystallizable oils having different crystalline melting temperatures within the rubbery plateau. In general, a crystallizable oil having a crystalline melting point close to the desired switching temperature is used. Suitable crystallizable oils are branched or unbranched oils that have a crystalline melting point, and include, but are not limited to, hexadecane (CMP about 18° C.), 1-hexadecanol (CMP about 48-50° C.), 1-tetradecane (CMP about 6° C.), 1-tetradecanol (CMP about 35-39° C.), octadecane (CMP about 26-29° C.), and octadecanol (CMP of about 56-59° C.). These oils are particularly useful in combination with polystyrene-block-polyisoprene-block-polystyrene (rubbery plateau from T1 about −70° C. to T2 about 95° C.) based pressure sensitive adhesives.

Another consideration when selecting the crystallizable oil for a particular application is the substrate on which the adhesive will be used. In general, polar oils such as the alcohols listed above provide for better adhesion to most substrates. For hydrophobic substrates, a hydrophobic oil such as hexadecane is useful. Additionally, the compatibility of the oil with the elastomer when the oil is above its crystalline melting point is important. This can be conveniently judged by the clarity of the mixture above the switching temperature, while the mixture is often opaque or translucent below the switching temperature.

In one embodiment, the crystallizable oil is hexadecane. In another embodiment, the crystallizable oil is 1-hexadecanol. In another embodiment, the crystallizable oil is 1-tetradecanol.

Pressure Sensitive Adhesives

Pressure sensitive adhesives do not normally exhibit temperature switchable properties; however, as disclosed herein, they may be combined with a crystallizable oil to form a temperature switchable adhesive. The crystallizable oils may be used in combination with a variety of pressure sensitive adhesives to prepare the temperature switchable adhesives disclosed herein. Typically, a pressure sensitive adhesive comprises a base polymer, a tackifier, and optionally other additives. Additionally, there are pressure sensitive adhesives that do not require the use of a tackifier because the base polymer used is self-tackifying. Examples of these self-tackifying pressure sensitive adhesives include, but are not limited to, acrylics. Crystallizable oils may be used with both tackifier-containing and self-tackifying pressure sensitive adhesives to provide temperature switchable adhesives.

In one embodiment, a pressure sensitive adhesive comprising an elastomer as the base polymer, and a tackifier are used. Any suitable elastomer known in the pressure sensitive adhesive art may be useful, including, but not limited to, thermoplastic rubbers, natural rubbers, butyl rubbers, polyisobutylene polymers, vinyl ether polymers, ethylene/acrylic copolymers, and silicone-based rubbers. In one embodiment, the elastomer is a thermoplastic rubber of the ABA block copolymer type, wherein A is a thermoplastic polystyrene end-block and B is a rubber mid-block, selected from polyisoprene, polybutadiene, and poly(ethylene/butylene). Typically, the elastomer has a thermoplastic polystyrene end-block content of about 14% to about 30% by weight of the block copolymer. Suitable elastomers are available from commercial sources, such as Sigma-Aldrich, and the Dow Chemical Co. (Midland, Mich.).

In one embodiment, the elastomer is a styrene-isoprene-styrene triblock copolymer which has a styrene content of about 14% to about 22% by weight. In another embodiment, the elastomer is a styrene-isoprene-styrene triblock copolymer which has a styrene content of about 22% by weight.

The tackifier used may be any suitable tackifier known in the art. Exemplary tackifiers include, but are not limited to, poly-$\beta$-pinene, abietic acid, abietic acid esters, hydrogenated abietic acid and its esters, poly-$\alpha$-pinene, neoabietic acid, palustric acid, dihydroabietic acid, dehydroabietic acid, pimaric acid, isopimaric acid, styrene-based tackifiers such as styrene, methyl styrene, indene, and methyl indene; and tackifiers based on oligomers of diclyopentadienes and oligomers of butadienes. In one embodiment, the tackifier is poly-$\beta$-pinene (CAS No. 70750-58-2) or abietic acid (CAS No. 514-10-3). Typically, the tackifier and base polymer are combined in weight ratios of about 0.8:1 to about 3.0:1, and more particularly, from about 1:1 to about 2:1, respectively.

Temperature Switchable Adhesives

The temperature switchable adhesives disclosed herein are prepared by combining at least one crystallizable oil with at least one pressure sensitive adhesive, which does not exhibit temperature switchable properties. A mixture of two or more pressure sensitive adhesives and/or two or more crystallizable oils may also be used. The crystallizable oil is used at a concentration of at least about 20%, more particularly, at least about 25% by weight relative to the total weight of the composition. The choice of the crystallizable oil depends on several factors, including the pressure sensitive adhesive used, the switching temperature desired, and the substrate to which the adhesive is applied, as described above.

The temperature switchable adhesives disclosed herein have temperature switchable adhesion and temperature switchable tack. The adhesion is high below the switching temperature and decreases sharply above the switching temperature. In contrast, the tack is low below the switching temperature and increases sharply above the switching temperature.

In one embodiment, the temperature switchable adhesives comprise at least one elastomer, at least one tackifier, and at least one crystallizable oil. Mixtures of two or more elastomers, and/or two or more tackifiers, and/or two or more crystallizable oils may also be used. In the temperature switchable adhesives disclosed herein, the elastomer, the tackifier, and the crystallizable oil are typically used in a ratio given as elastomer plus tackifier to crystallizable oil of about 0.66 to about 5.0 by weight. In one embodiment, the ratio of elastomer plus tackifier to crystallizable oil is 2.0. In another embodiment, the ratio of elastomer plus tackifier to crystallizable oil is 1.0. In another embodiment, the ratio of elastomer plus tackifier to crystallizable oil is 4.0.

In another embodiment wherein a self-tackifying pressure sensitive adhesive is used, the ratio of the self-tackifying base polymer to the crystallizable oil is from about 0.66 to about 5.0 by weight.

The adhesive properties of the temperature switchable adhesives disclosed herein may be tuned for different applications. The switching temperature may be tuned coarsely by changing the crystallizable oil, as described above. Other properties of the temperature switchable adhesives may be adjusted by changes in formulation, as is well known in the art. For example, tack may be increased at the expense of peel strength by increasing the ratio of tackifier to elastomer. Cohesive strength (i.e., the strength of the forces that hold adjacent molecules together within the adhesive) may be improved by increasing the molecular weight of the elastomer, at the expense of ease of processing. The cohesive properties of the temperature switchable adhesive may likewise be improved by means of cross-linking the elastomeric component. These principles of formulation are well understood by those skilled in the art of pressure sensitive adhesives.

The temperature switchable adhesives may optionally comprise one or more additives, which are known in the art. Examples of suitable additives include, but are not limited to, inorganic extenders, stabilizers, antioxidants, plasticizers, flow modifiers, dyes, pigments, heat reactive curing compounds, light reactive curing compounds, and wetting agents. These additives may be incorporated into the temperature switchable adhesives disclosed herein in minor or larger amounts, depending on the intended use of the adhesive.

The temperature switchable adhesives may be prepared using techniques known in the art. For example, the base polymer, the tackifier, if used, the crystallizable oil, and optional additives may be dissolved in a suitable solvent and applied to a backing, with subsequent removal of the solvent, as described below. Alternatively, the aforementioned ingredients may be blended in the melt using a high shear mixer or an extruder.

Temperature Switchable Adhesive Assemblies

The temperature switchable adhesives are generally used as a coating on a backing to form a temperature switchable adhesive assembly. Any appropriate backing may be used, including, but not limited to, tapes, films of synthetic polymers, films of natural polymers, sheets of synthetic polymers, sheets of natural polymers, woven fabrics, nonwoven fabrics, and paper products, such as labels, paper tapes, envelopes, stamps, and cardboard. The backing should maintain structural integrity at the temperature of application to the desired surface and at the elevated temperature required to release the assembly from the surface. The backing may be coated with the temperature switchable adhesive in various ways, including, but not limited to, spraying, painting, dipping, gravure printing, rolling, laminating, and the like. The adhesive composition may also be applied by transfer from a release sheet. For example, coating technologies widely practiced in the pressure sensitive adhesive art may be employed for laminating these temperature switchable adhesives to backings and release paper (see for example, *Handbook of Pressure-Sensitive Adhesive Technology*, D. Satas, ed, Van Nostrand Reinhold, New York, N.Y., 1982). These coating technologies include, but are not limited to, knife-over-roll, trailing blade, wire-wound rod, air doctor, reverse roll, gravure roll, and slot orifice. The composition may be applied neat, or in a suitable solvent, or as an emulsion or a latex.

The thickness of the adhesive layer will vary depending on the intended application. Typically, the thickness of the adhesive layer is about 0.5 mils (0.0127 mm) to about 25 mils (0.76 mm). The appropriate adhesive layer thickness for any particular application may be readily determined using routine experimentation by one skilled in the art.

The temperature switchable adhesive assemblies may be used for a variety of medical applications in the form of adhesive tapes, adhesive bandages, immobilization devices, wound dressings, transdermal delivery devices, EKG electrodes, and the like. Additionally, the assemblies may be used for industrial and consumer applications, such as masking tapes, stencils, envelopes, labels, stamps, wallpaper, and floor tiles.

The temperature switchable adhesive assembly can be attached to the desired substrate by applying it to the surface with a small amount of pressure. Because the temperature switchable adhesives have temperature switchable tack that changes in the opposite direction as the adhesive strength, the assembly is applied to the desired substrate at a temperature above the switching temperature to form the bond and then is cooled to a temperature below the switching temperature to maintain the bond. The assembly is left in place for as long as desired and then is removed by heating the assembly to a temperature above the switching temperature, where the adhesive strength is significantly diminished. Heating may be accomplished using any suitable means depending on the application. For example, a warm compress, a chemical heat pack, a heating pad, or warm water may be used for medical applications, while a hair dryer, a hot air gun, an oven, a warming chamber, or ambient heat may be used for industrial and consumer applications.

In another embodiment, the invention provides a method for imparting temperature switchable properties to pressure sensitive adhesive comprising mixing the pressure sensitive adhesive with a suitable crystallizable oil using the methods described above.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "sec" means second(s), "mL" means milliliter(s), "µL" means microliter(s), "cm" means centimeter(s), "mm" means millimeter(s), "µm" means micrometer(s), "mils' means thousandths of an inch, "g" means gram(s), "mg" means milligram(s), "kg" means kilogram(s), "mmol" means millimole(s), "lb" means pound(s), "wt %" means percent by weight, and "PVC" means poly(vinyl chloride).

General Methods:
Reagents and Solvents:

The triblock copolymer, polystyrene-block-polyisoprene-block-polystyrene, referred to hereafter as "PSIS", (CAS No. 25038-32-8, 22 wt % styrene, melt index 3 g/10 min, viscosity 12 poise (25 wt % in toluene, 25° C., Brookfield)), poly-β-pinene, abietic acid, hexadecane, 1-hexadecanol, and 1-tetradecanol were obtained from Sigma-Aldrich (St. Louis, Mo.). Solvents were distilled according to standard solvent purification procedures.

Example 1

Temperature Switchable Adhesive Based on Hexadecane as a Crystallizable Oil Additive This Example demonstrates a temperature switchable adhesive using hexadecane as a crystallizable oil additive. The temperature switchable adhesive was prepared by blending the triblock copolymer polystyrene-polyisoprene-polystyrene (PSIS), poly-β-pinene, and hexadecane in a 1:1:1 weight ratio, i.e., ratio of elastomer plus tackifier to crystallizable oil of 2.0.

A toluene solution of PSIS, poly-β-pinene, and hexadecane was prepared with the three components in a 1:1:1 weight ratio at approximately 20% solids. This solution was cast directly on a PVC backing (3.775 mils (95.9 µm) thick) using a doctors blade at 30 mils (760 µm). The resulting coated PVC was dried in a vacuum oven for 30 min at 70° C. The coated PVC was non-uniformly coated but was nevertheless strongly tacky regardless of thickness over its entire area at temperatures above the switching temperature. A siliconized release paper was applied to protect the adhesive layer until the time of use.

The adhesive film was laminated onto a PVC-faced cloth (96.5 µm thickness), textured to be a leather look-alike (obtained from a local fabric store), at 34° C. according to ASTM Method D-3330. For creating the adhesive bonds by the ASTM procedure, an aluminum metal plate was used which was heated by a hotplate. The temperature of the metal plate was maintained by manual temperature adjustment using a thermocouple to monitor the temperature. This is referred to as the "set temperature" as listed in the data. A 2.5 lb (1.13 kg) metal wallpaper seam roller, attached to an Instron® device with a cross-head speed of 12 in/min (30.5 cm/min), was used to laminate the bond by rolling it back and forth across the sample. The resulting laminate was allowed to cool to room temperature.

The samples were maintained at the set temperature in a temperature-controlled oven until the samples were ready for measuring the temperature dependence of the 90° peel strength. The peel strength measurements were done according to IPC Test Method 650, using an Instron® device equipped with a temperature-controlled oven and a metal wheel. The sample was mounted on the wheel using double-faced Kapton® adhesive tape on the edge of the roller and metal adhesive tape to hold down the ends. The sample sizes were typically 1 inch×3 inches (2.5 cm×7.6 cm) or 0.5 inch×3 inches (1.3 cm×7.6 cm). The clamps on the Instron® device were attached to the free end of the backing material. The samples were temperature equilibrated for 2 min before testing. The samples were pulled at 6 inches/min (15.2 cm/min), and the data was recorded and processed using MTS Test Works 4 system, purchased from the MTS Systems Corp. (Eden Prairie, Minn.) for software test control and data acquisition. Load and displacement were captured through an analog to digital card and the average calculated by integration through selected points on the curve. The peel strength as a function of temperature was then determined, allowing a 2 min equilibration time for the samples at each temperature. The peel strengths at different temperatures, given as the average and standard deviation measured along the length of each of two samples, are shown in Table 1.

TABLE 1

Peel Strengths of the Temperature Switchable Pressure Sensitive
Adhesive Comprising Hexadecane as a Function of Temperature

| Temperature °C. | Average Peel Strength g/mm | Peel Strength Standard Deviation g/mm |
|---|---|---|
| 4 | 15.2 | 4.6 |
| 4 | 29.5 | 17.5 |
| 6 | 10.7 | 3.0 |
| 8 | 15.7 | 6.6 |
| 10 | 8.76 | 3.8 |
| 12 | 3.9 | 0.5 |
| 16 | 3.8 | 0.4 |
| 19 | 3.9 | 0.7 |
| 34 | 0.79 | 0.21 |

The results show that there was a sharp decrease in peel strength between temperatures of 8° C. and 12° C., demonstrating the temperature switchable property of the adhesive.

Example 2

Temperature Switchable Adhesive Based on 1-Hexadecanol as a Crystallizable Oil Additive This Example demonstrates a temperature switchable adhesive using 1-hexadecanol as a crystallizable oil additive. The temperature switchable adhesive was prepared by blending the triblock copolymer polystyrene-polyisoprene-polystyrene (PSIS), poly-β-pinene, and 1-hexadecanol in a 1:1:1 weight ratio, i.e., ratio of elastomer plus tackifier to crystallizable oil of 2.0.

Temperature Switchable Peel Strength:

A toluene solution of PSIS, poly-β-pinene, and 1-hexadecanol was prepared with the three components in a 1:1:1 weight ratio at approximately 20% solids. This solution was cast directly on a siliconized release paper using a doctors blade at 30 mils (0.76 mm). The resulting coated paper was dried in a vacuum oven for 30 min at 70° C. A PVC backing was then applied to the hot adhesive and smoothed with a wallpaper seam roller, giving a uniform film with thickness of 3.61±0.18 mils (91.7±4.6 μm). A siliconized release paper was applied to protect the adhesive layer until the time of use. The adhesive was laminated onto a PVC leather-like substrate, as described in Example 1, at 65° C. The peel strength measurements were done according to IPC Test Method 650, as described in Example 1. The peel strengths at different temperatures, given as the average and standard deviation measured along the length of each of two samples, are shown in Table 2.

TABLE 2

Peel Strengths of the Temperature Switchable Pressure Sensitive
Adhesive Comprising 1-Hexadecanol as a Function of Temperature

| Temperature °C. | Average Peel Strength g/mm | Peel Strength Standard Deviation g/mm |
|---|---|---|
| 23 | 59.0 | 5.4 |
| 31 | 47.8 | 16.3 |
| 34 | 62.3 | 8.7 |
| 37 | 47.9 | 11.2 |
| 40 | 14.5 | 6.6 |
| 43 | 12.3 | 6.2 |
| 46 | 4.7 | 1.2 |
| 49 | 11.4 | 5.0 |
| 52 | 8.4 | 1.7 |
| 55 | 4.3 | 1.0 |
| 58 | 4.3 | 1.8 |

The results show that there was a sharp decrease in peel strength between temperatures of 37° C. and 40° C., demonstrating the temperature switchable property of the adhesive.

Temperature Switchable Tack:

Adhesive films on PVC backing were prepared as described above. The thickness of the films was approximately 14 mils (0.36 mm). The tack of these films was measured against the PVC surrogate substrate according to a procedure that was based on ASTM D 6195 Standard Test Methods for Loop Tack, Method A (using a Tensile Tester). A 1 inch (2.5 cm) wide×7 inch (17.8 cm) long specimen strip was gripped at its ends forming a loop. The ends were covered with 1 inch (2.5 cm) wide masking tape and attached to the instrument by means of an air grip. The test machine was programmed to cycle from 4 inches (10.2 cm) above the 1 inch square contact face to 1 inch above the face, then reverse back to the start. The tear-drop loop formed by gripping the two ends of the sample contacted the face and laid flat on the face, and then was pulled off while measuring the forces in accord with the test protocol. This method was modified by backing the tape with foil tape to increase contact pressure and make the measured strengths higher than the noise of the test unit. The tack values obtained are given in Table 3.

TABLE 3

Tack of the Temperature Switchable Adhesive Comprising 1-Hexadecanol
as a Function of Temperature

| Temperature, °C. | Tack, g |
|---|---|
| 23 | 0.00 |
| 37 | 2.68 |
| 45 | 11.02 |
| 50 | 21.95 |

Example 3

Temperature Switchable Adhesive Based on 1-Hexadecanol as a Crystallizable Oil Additive This Example demonstrates a temperature switchable adhesive using 1-hexadecanol as a crystallizable oil additive. The temperature switchable adhesive was prepared by blending the triblock copolymer polystyrene-polyisoprene-polystyrene (PSIS), abietic acid, and 1-hexadecanol in a 2:1:3 weight ratio, i.e., ratio of elastomer plus tackifier to crystallizable oil of 1.0.

Temperature Switchable Peel Strength:

For casting films of the adhesives, a solution containing 20.6 g of styrene-isoprene-styrene triblock copolymer ("PSIS", 25 wt % in toluene), a solution containing 12.6 g of abietic acid and 12.6 g of 1-hexadecanol (1:1, 20.445 wt % in tetrahydrofuran) and a solution containing 13.73 g of 1-hexadecanol (37.5 wt % in tetrahydrofuran) were mixed on a tumbler in a mill jar for 30 min. The concentration of solids in the mixed solution was 33 wt %, with weight ratios of PSIS:

abietic acid:1-hexadecanol of 2:1:3. This solution was cast to a thickness of 30 mils (0.76 mm) using a doctors blade onto a clean glass plate. The solution cast film was then dried for 30 min in a vacuum oven at 70° C. A PVC backing was then applied to the adhesive at 70° C. and was smoothed out with a wall paper seam roller, which readily transferred the film to the PVC backing. The resulting laminate was peeled off the glass plate after cooling to room temperature. A second layer of adhesive film was prepared identically and layered on this film at 70° C. to give a total film thickness of 16.2±2.5 mils (0.412±0.063 mm). The resulting adhesive film was stored with a release paper covering until it was ready for use.

For testing the peel strength, the release paper was removed and 0.5 inch×3.0 inch (1.27 cm×7.62 cm) strips of adhesive on PVC were laminated onto a PVC leather-like substrate at 65° C., as described in Example 1. The peel strength measurements were done according to IPC Test Method 650, as described in Example 1. The peel strengths at different temperatures, given as the average and standard deviation measured along the length of each of three samples, are shown in Table 4.

TABLE 4

Peel Strengths of the Temperature Switchable Pressure Sensitive Adhesive Comprising 1-Hexadecanol as a Function of Temperature

| Temperature ° C. | Average Peel Strength g/mm | Peel Strength Standard Deviation g/mm |
|---|---|---|
| 23 | 6.0 | 1.8 |
| 30 | 5.6 | 0.7 |
| 35 | 4.9 | 0.4 |
| 40 | 4.5 | 0.9 |
| 45 | 5.1 | 0.4 |
| 50 | 0.4 | 0.2 |

The results show that there was a sharp decrease in peel strength between temperatures of 45° C. and 50° C., demonstrating the temperature switchable property of the adhesive.

Example 4

Comparative

Pressure Sensitive Adhesive Using a Noncrystallizable Oil Additive

This comparative Example demonstrates that a pressure sensitive adhesive made with a noncrystallizable oil additive does not possess temperature switchable properties. The pressure sensitive adhesive was prepared by blending the triblock copolymer polystyrene-polyisoprene-polystyrene (PSIS), abietic acid, and mineral oil in a 2:1:3 weight ratio, i.e., ratio of elastomer plus tackifier to oil of 1.0.

For casting films of the adhesive, a solution of 20 g of abietic acid solution (25.7 wt %) was mixed with 15.42 g of mineral oil. To this was added 23.2 g of styrene-isoprene-styrene triblock copolymer (PSIS) as a 25 wt % solution in toluene. The resulting solution was mixed in a mill jar on a tumbler for 30 min, giving a final concentration of 40 wt % solids, with weight ratios of PSIS:Abietic acid:mineral oil of 2:1:3. This solution was cast to a thickness of 30 mils (0.76 mm) using a doctors blade onto siliconized release paper that was mounted on a glass plate. The solution cast film was then dried for 30 min in a vacuum oven at 70° C. A PVC backing was then applied to the adhesive at 70° C. and was smoothed out with a wall paper seam roller, which readily transferred the film to the PVC backing. The release paper was peeled off the adhesive after cooling to room temperature. A second layer of adhesive film was prepared identically and layered on this film at 70° C. to give a total film thickness of 15.5±5.4 mils (0.394±0.137 mm). The resulting adhesive film was stored with a release paper covering until it was ready for use.

For testing the peel strength, the release paper was removed and 0.5 inch×3.0 inch (1.27×7.62 cm) strips of adhesive on PVC were laminated onto a PVC leather-like substrate at 65° C., as described in Example 1. The peel strength measurements were done according to IPC Test Method 650, as described in Example 1. The peel strengths at different temperatures, given as the average and standard deviation measured along the length of each of three samples, are shown in Table 5.

TABLE 5

Peel Strengths of the Pressure Sensitive Adhesive Containing Mineral Oil as a Function of Temperature

| Temperature ° C. | Average Peel Strength g/mm | Peel Strength Standard Deviation g/mm |
|---|---|---|
| 23 | 33.7 | 3.4 |
| 30 | 30.3 | 3.8 |
| 35 | 33.6 | 10.0 |
| 40 | 37.5 | 8.6 |
| 45 | 31.0 | 7.1 |
| 50 | 18.9 | 4.1 |

The results show that there was no sharp decrease in peel strength over a narrow temperature range, demonstrating that the pressure sensitive adhesive containing the noncrystallizable oil does not function as a temperature switchable adhesive.

Example 5

Comparative

Pressure Sensitive Adhesive Containing a Low Level of a Crystallizable Oil Additive This comparative Example demonstrates that a pressure sensitive adhesive made with a low level of a crystallizable oil additive does not possess temperature switchable properties. The pressure sensitive adhesive was prepared by blending the triblock copolymer polystyrene-polyisoprene-polystyrene (PSIS), poly-β-pinene, and hexadecane in a 1:1:0.05 weight ratio, i.e., ratio of elastomer plus tackifier to crystallizable oil of 40.0, giving an oil concentration of about 2.4% by weight.

A toluene solution of PSIS, poly-β-pinene, and hexadecane was prepared with the three components in a 1:1:0.05 weight ratio at approximately 20% solids. This solution was cast directly on a PVC backing (3.775 mils (95.9 μm) thick) using a doctors blade at 30 mils (0.76 mm). The resulting coated PVC was dried in a vacuum oven for 30 min at 70° C. The coated PVC was non-uniformly coated but was nevertheless strongly tacky regardless of thickness over its entire area at temperatures above the switching temperature. A siliconized release paper was applied to protect the adhesive layer until the time of use.

For testing the peel strength, the release paper was removed and 0.5 inch×3.0 inch (1.27×7.62 cm) strips of adhesive on PVC were laminated onto a PVC leather-like substrate at 34° C., as described in Example 1. The peel strength measurements were done according to IPC Test Method 650, as described in Example 1. The peel strengths at different temperatures, given as the average and standard deviation measured along the length of each of three samples, are shown in Table 6.

TABLE 6

Peel Strengths of the Pressure Sensitive Adhesive Containing a Low Level of a Crystallizable Oil Additive as a Function of Temperature

| Temperature °C. | Average Peel Strength g/mm | Peel Strength Standard Deviation g/mm |
|---|---|---|
| 23 | 101.3 | 18.7 |
| 35 | 74.1 | 7.3 |
| 40 | 51.9 | 7.7 |
| 45 | 41.2 | 8.9 |
| 50 | 33.7 | 3.4 |
| 55 | 29.0 | 1.5 |

The results show that there was no sharp decrease in peel strength over a narrow temperature range, demonstrating that the pressure sensitive adhesive containing a low level of the crystallizable oil does not function as a temperature switchable adhesive.

Example 6

Temperature Switchable Adhesive Based on 1-Hexadecanol as a Crystallizable Oil Additive This Example demonstrates a temperature switchable adhesive using 1-hexadecanol as a crystallizable oil additive. The temperature switchable adhesive was prepared by blending the triblock copolymer polystyrene-polyisoprene-polystyrene (PSIS), poly-β-pinene, and 1-hexadecanol in a 2:1:1 weight ratio, i.e., ratio of elastomer plus tackifier to crystallizable oil of 3.0.

An adhesive film of PSIS, poly-β-pinene, and 1-hexadecanol was prepared and cast on a PVC backing as described in Example 2, except that the weight ratio of PSIS:poly-β-pinene:1-hexadecanol was 2:1:1. The film was laminated onto a PVC leather-like substrate at 65° C., as described in Example 1. The thickness of the adhesive film was 20.1±4.3 mils (0.51±0.11 mm) The peel strength measurements were done according to IPC Test Method 650, as described in Example 1. The peel strengths at different temperatures, given as the average and standard deviation measured along the length of each of two samples, are shown in Table 7.

TABLE 7

Peel Strengths of the Temperature Switchable Pressure Sensitive Adhesive Comprising 1-Hexadecanol as a Function of Temperature

| Temperature °C. | Average Peel Strength g/mm | Peel Strength Standard Deviation g/mm |
|---|---|---|
| 30 | 69.4 | 6.3 |
| 35 | 57.5 | 6.0 |
| 40 | 48.5 | 6.7 |
| 45 | 12.9 | 1.2 |
| 50 | 5.3 | 0.8 |
| 55 | 4.9 | 0.3 |

The results show that there was a sharp decrease in peel strength between temperatures of 40° C. and 45° C., demonstrating the temperature switchable property of the adhesive.

Example 7

Temperature Switchable Adhesive Based on 1-Tetradecanol as a Crystallizable Oil Additive This Example demonstrates a temperature switchable adhesive with a lower switching temperature using 1-tetradecanol as a crystallizable oil additive. The temperature switchable adhesive was prepared by blending the triblock copolymer polystyrene-polyisoprene-polystyrene (PSIS), poly-β-pinene, and 1-tetradecanol in a 1:1:1 weight ratio, i.e., ratio of elastomer plus tackifier to crystallizable oil of 2.0.

An adhesive film of PSIS/poly-β-pinene/1-tetradecanol in a 1:1:1 weight ratio on PVC backing was prepared according to the procedure described in Example 1. It was laminated onto the PVC leather-like surrogate substrate at 65° C. according to ASTM Method D-3330, as described in Example 1. The adhesive thickness was 5.2±2.9 mils (0.13±0.074 mm). The peel strength as a function of temperature was then determined, allowing two minutes equilibration time for the samples at each temperature, as described in Example 1. The peel strengths at different temperatures, given as the average and standard deviation measured along the length of each of two samples, are shown in Table 8.

TABLE 8

Peel Strengths of the Temperature Switchable Pressure Sensitive Adhesive Comprising 1-Tetradecanol as a Function of Temperature

| Temperature °C. | Average Peel Strength g/mm | Peel Strength Standard Deviation g/mm |
|---|---|---|
| 23 | 39.3 | 15.0 |
| 30 | 38.5 | 3.9 |
| 35 | 9.9 | 1.2 |
| 40 | 4.9 | 0.4 |
| 45 | 3.2 | 0.3 |
| 50 | 3.4 | 0.3 |

The results show that there was a sharp decrease in peel strength between temperatures of 30° C. and 35° C., demonstrating the temperature switchable property of the adhesive.

What is claimed is:

1. A temperature switchable adhesive composition comprising:
    a) at least one pressure sensitive adhesive, which does not exhibit temperature switchable properties, having a rubbery plateau between a first temperature T1 and a second temperature T2, said pressure sensitive adhesive comprising at least one elastomer selected from the group consisting of thermoplastic rubbers, natural rubbers, butyl rubbers, polyisobutylene polymers, vinyl ether polymers, ethylene/acrylic copolymers, silicone-based rubbers, and acrylics; and
    b) at least one crystallizable oil having a crystalline melting point between T1 and T2 in an amount of at least about 20% by weight of the composition;
    wherein the elastomer is an ABA block copolymer, wherein
        a) A is a thermoplastic polystyrene end-block; and
        b) B is a rubber mid-block selected from the group consisting of polyisoprene, polybutadiene, and poly(ethylene/butylene);
            wherein the elastomer has a thermoplastic polystyrene end-block content of about 14% to about 30% by weight of the block copolymer; and wherein if the elastomer is selected from the group consisting of thermoplastic rubbers, natural rubbers, butyl rubbers, polyisobutylene polymers, vinyl ether polymers, ethylene/acrylic copolymers, and silicone-based rubbers, the pressure sensitive adhesive further comprises at least one tackifier.

2. The temperature switchable adhesive composition according to claim 1, wherein the composition comprises a ratio of elastomer plus tackifier to crystallizable oil of about 0.66:1 to about 5.0:1 by weight.

3. The temperature switchable adhesive composition according to claim 1, wherein the ABA block copolymer is a styrene-isoprene-styrene triblock copolymer having a styrene content of about 14% to about 22% by weight.

4. The temperature switchable adhesive composition according to claim 1 wherein the tackifier is selected from the group consisting of poly-β-pinene, abietic acid, abietic acid esters, hydrogenated abietic acid, hydrogenated abietic acid esters, poly-a-pinene, neoabietic acid, palustric acid, dihydroabietic acid, dehydroabietic acid, pimaric acid, isopimaric acid, styrene, methyl styrene, indene, methyl indene, oligomers of diclyopentadienes, and oligomers of butadienes.

5. The temperature switchable adhesive composition according to claim 4 wherein the tackifier is poly-β-pinene or abietic acid.

6. The temperature switchable adhesive composition according to claim 1 wherein the crystallizable oil is present in an amount of at least about 25% by weight of the composition.

7. The temperature switchable adhesive composition according to claim 1 wherein the crystallizable oil is selected from the group consisting of: hexadecane, 1-hexadecanol, 1-tetradecane, 1-tetradecanol, octadecane, and octadecanol.

8. The temperature switchable adhesive composition according to claim 1 wherein the elastomer is an acrylic and the pressure sensitive adhesive is self-tackifying.

9. A temperature switchable adhesive assembly comprising:
   a) a backing; and
   b) a coating comprising the temperature switchable adhesive composition of claim 1.

10. The temperature switchable adhesive assembly according to claim 9, wherein the backing is selected from the group consisting of: tapes, films of synthetic polymers, films of natural polymers, sheets of synthetic polymers, sheets of natural polymers, woven fabrics, nonwoven fabrics, and paper products.

11. The temperature switchable adhesive assembly according to claim 9, wherein the assembly has a form selected from the group consisting of adhesive tapes, adhesive bandages, immobilization devices, wound dressings, transdermal delivery devices, EKG electrodes, masking tapes, stencils, envelopes, labels, stamps, wall paper, and floor tiles.

12. A method for imparting temperature switchable properties to a pressure sensitive adhesive, said method comprising the steps of:
   a) providing at least one pressure sensitive adhesive, which does not exhibit temperature switchable properties, having a rubbery plateau between a first temperature T1 and a second temperature T2, said pressure sensitive adhesive comprising at least one elastomer selected from the group consisting of thermoplastic rubbers, natural rubbers, butyl rubbers, polyisobutylene polymers, vinyl ether polymers, ethylene/acrylic copolymers, silicone-based rubbers, and acrylics; and
   b) mixing the at least one pressure sensitive adhesive with at least one crystallizable oil having a crystalline melting point between T1 and T2, wherein the crystallizable oil is in an amount of at least about 20% by weight;
wherein the elastomer is an ABA block copolymer, wherein
   a) A is a thermoplastic polystyrene end-block; and
   b) B is a rubber mid-block selected from the group consisting of polyisoprene, polybutadiene, and poly(ethylene/butylene);
      wherein the elastomer has a thermoplastic polystyrene end-block content of about 14% to about 30% by weight of the block copolymer; and wherein if the elastomer is selected from the group consisting of thermoplastic rubbers, natural rubbers, butyl rubbers, polyisobutylene polymers, vinyl ether polymers, ethylene/acrylic copolymers, and silicone-based rubbers, the pressure sensitive adhesive further comprises at least one tackifier.

13. The method according to claim 12 wherein the pressure sensitive adhesive comprises a ratio of elastomer plus tackifier to crystallizable oil of about 0.66:1 to about 5.0:1 by weight.

14. The method according to claim 12 wherein the crystallizable oil is selected from the group consisting of hexadecane, 1-hexadecanol, 1-tetradecane, 1-tetradecanol, octadecane, and octadecanol.

\* \* \* \* \*